(12) United States Patent
Mori et al.

(10) Patent No.: US 8,269,464 B2
(45) Date of Patent: Sep. 18, 2012

(54) ELECTRONIC DEVICE AND IMAGING APPARATUS

(75) Inventors: Nobuyuki Mori, Osaka (JP); Makoto Akesaka, Osaka (JP)

(73) Assignee: Sony Corporation (JP)

( * ) Notice: Subject to any disclaimer, the term of this patent is extended or adjusted under 35 U.S.C. 154(b) by 1003 days.

(21) Appl. No.: 12/152,262

(22) Filed: May 13, 2008

(65) Prior Publication Data

US 2008/0315840 A1    Dec. 25, 2008

(30) Foreign Application Priority Data

May 18, 2007    (JP) ................ P2007-132638

(51) Int. Cl.
*H02J 7/00*    (2006.01)
(52) U.S. Cl. .................................. 320/134; 320/119
(58) Field of Classification Search .............. None
See application file for complete search history.

(56) References Cited

U.S. PATENT DOCUMENTS

| | | | | |
|---|---|---|---|---|
| 5,621,298 A | * | 4/1997 | Harvey | 320/134 |
| 5,905,914 A | * | 5/1999 | Sakai et al. | 710/67 |
| 2007/0285056 A1 | * | 12/2007 | Yoon et al. | 320/116 |
| 2008/0072902 A1 | * | 3/2008 | Setzer et al. | 128/204.21 |

FOREIGN PATENT DOCUMENTS

| | | |
|---|---|---|
| JP | 2001-021974 A | 1/2001 |
| JP | 2003-272716 A | 9/2003 |
| JP | 2006-017595 A | 1/2006 |
| JP | 2006017595 A * | 1/2006 |
| JP | 2007-020335 A | 1/2007 |
| JP | 2007-028738 A | 2/2007 |

* cited by examiner

*Primary Examiner* — Huy Q Phan
*Assistant Examiner* — Temilade S Rhodes-Vivour
(74) *Attorney, Agent, or Firm* — Lerner, David, Littenberg, Krumholz & Mentlik, LLP

(57) ABSTRACT

An electronic device having a display section, which may include, a housing section configured to house a plurality of batteries, a detection section configured to detect status of each of the plurality of batteries housed in the housing section, a selection section configured to select part of the plurality of batteries for use as a power supply of the electronic device in accordance with the status detected by the detection section, and a display control section configured to display on the display section an indication identifying the part of the plurality of batteries.

9 Claims, 10 Drawing Sheets

ELECTRONIC DEVICE AND IMAGING APPARATUS

CROSS-REFERENCE TO RELATED APPLICATIONS

The present application claims priority from Japanese Patent Application No. JP 2007-132638 filed in the Japanese Patent Office on May 18, 2007, the entire content of which is incorporated herein by reference.

BACKGROUND OF THE INVENTION

1. Field of the Invention

The present invention relates to technical improvements for an electronic device having a housing for accommodating at least two batteries.

2. Description of the Related Art

There exist portable electronic devices such as digital cameras with a battery housing for accommodating a plurality of batteries that are intended to ensure a long-hour use of the device in question. The multiple batteries placed in the battery housing are typically connected in parallel by way of back-flow prevention diodes, thus supplying the relevant components of the electronic device with the power from the battery of a potential higher than that of any other battery housed inside. The technique based on the back-flow prevention diode arrangement causes a plurality of batteries to be tapped evenly for use. That means the batteries are exhausted at about the same time. This generally results in the inconvenience of having to replace (or recharge) the multiple batteries simultaneously.

The trouble above appears to be circumvented by the techniques proposed by Japanese Patent Laid-Open Nos. 2007-28738 and 2007-20335. The proposed techniques involve automatically selecting (i.e., extracting) one of a plurality of batteries in a battery housing on the basis of information about the output levels of the accommodated batteries. The multiple batteries in the battery housing are used one at a time according to the techniques, so that the batteries may be replaced (or recharged) in staggered fashion.

SUMMARY OF THE INVENTION

One disadvantage of the proposed techniques cited above is that the user may not furnished with information about which one of the batteries has been automatically selected for use. That means the user may be unable to identify and replace or recharge the battery that has been selectively used and exhausted.

Some digital cameras currently marketed are equipped with a monitor capable of displaying the remaining levels of a plurality of batteries placed in the battery housing. However, these cameras may fail to have their monitor display information about which one of the batteries is currently utilized. Moreover, getting the remaining battery levels displayed on the monitor requires the user to perform complicated operations starting from a menu screen.

The present invention has been made in view of the above circumstances and provides techniques for enabling the user easily to identify one of a plurality of batteries which has been automatically selected and utilized in an electronic device.

According to an embodiment of the present invention, there is provided an electronic device having a display section, which may include:

(a) a housing section configured to house a plurality of batteries;

(b) a detection section configured to detect status of each of the plurality of batteries housed in the housing section;

(c) a selection section configured to select part of the plurality of batteries for use as a power supply of the electronic device in accordance with the status detected by the detection section; and (d) a display control section configured to display on the display section an indication identifying the part of the plurality of batteries.

According to another embodiment of the present invention, there is provided an imaging apparatus having a display section, which may include:

(a) a housing section configured to house a plurality of batteries;

(b) a detection section configured to detect status of each of the plurality of batteries housed in the housing section;

(c) a selection section configured to select part of the plurality of batteries for use as a power supply of the imaging apparatus in accordance with the status detected by the detection section; and (d) a display control section configured to display on the display section an indication identifying the part of the plurality of batteries along with a display of information about imaging.

According to yet another embodiment of the present invention, there is provided an electronic device having a display section, which may include:

a detection section configured to detect status of each of a plurality of batteries;

a selection section configured to select part of the plurality of batteries for use as a power supply of the electronic device in accordance with the status detected by the detection section; and a display control section configured to display on the display section an indication identifying the part of the plurality of batteries.

According to the present invention embodied as outlined above, the detection section may detect status of each of a plurality of batteries housed in the housing section. Part of the plurality of batteries may be selected by the selection section for use as the power supply of the electronic device in accordance with the status detected by the detection section. On the display section, the display control section may display an indication identifying the selected part of the plurality of batteries. The display may permit easy identification of the battery which was automatically selected from the plurality of batteries and which is currently in use.

DETAILED DESCRIPTION OF THE PREFERRED EMBODIMENTS

First Embodiment (Major Components of the Imaging Apparatus)

Figure 1:
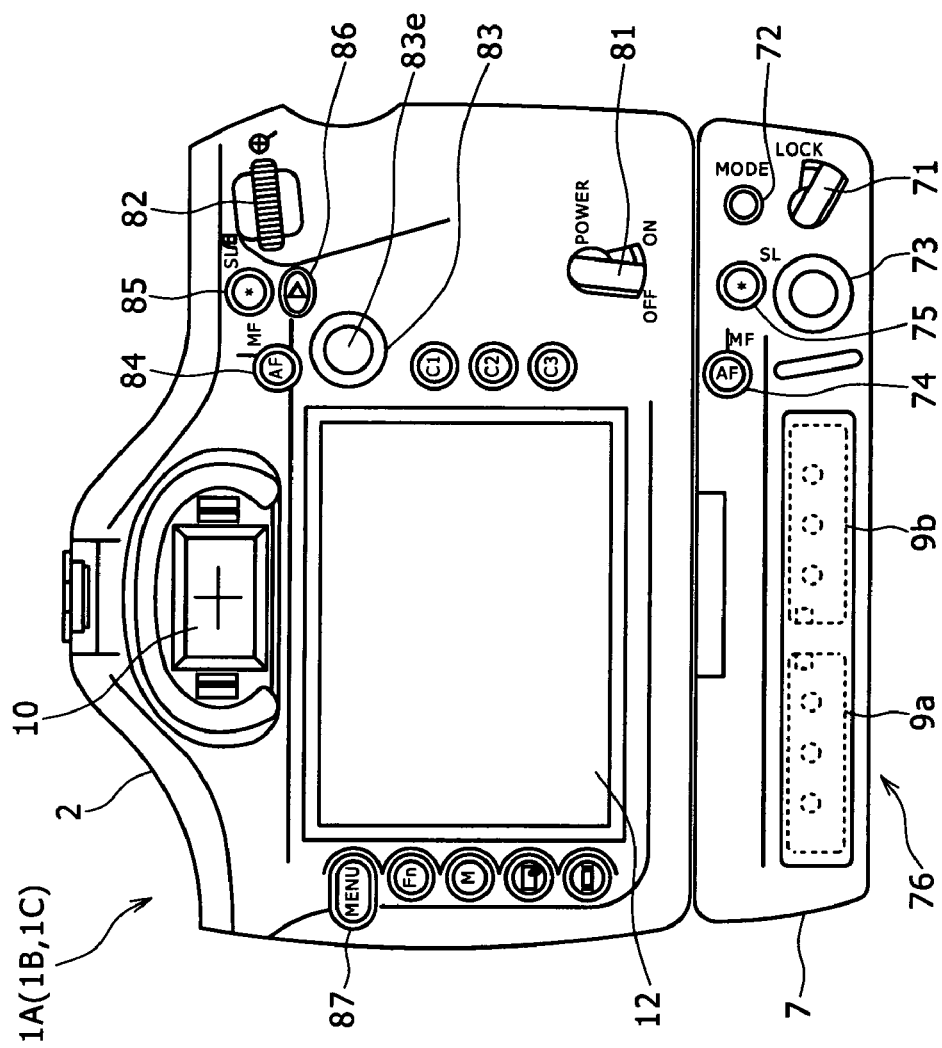
FIG. 1 is an external back view of an imaging apparatus practiced as a first embodiment of the present invention.
Figure 2:
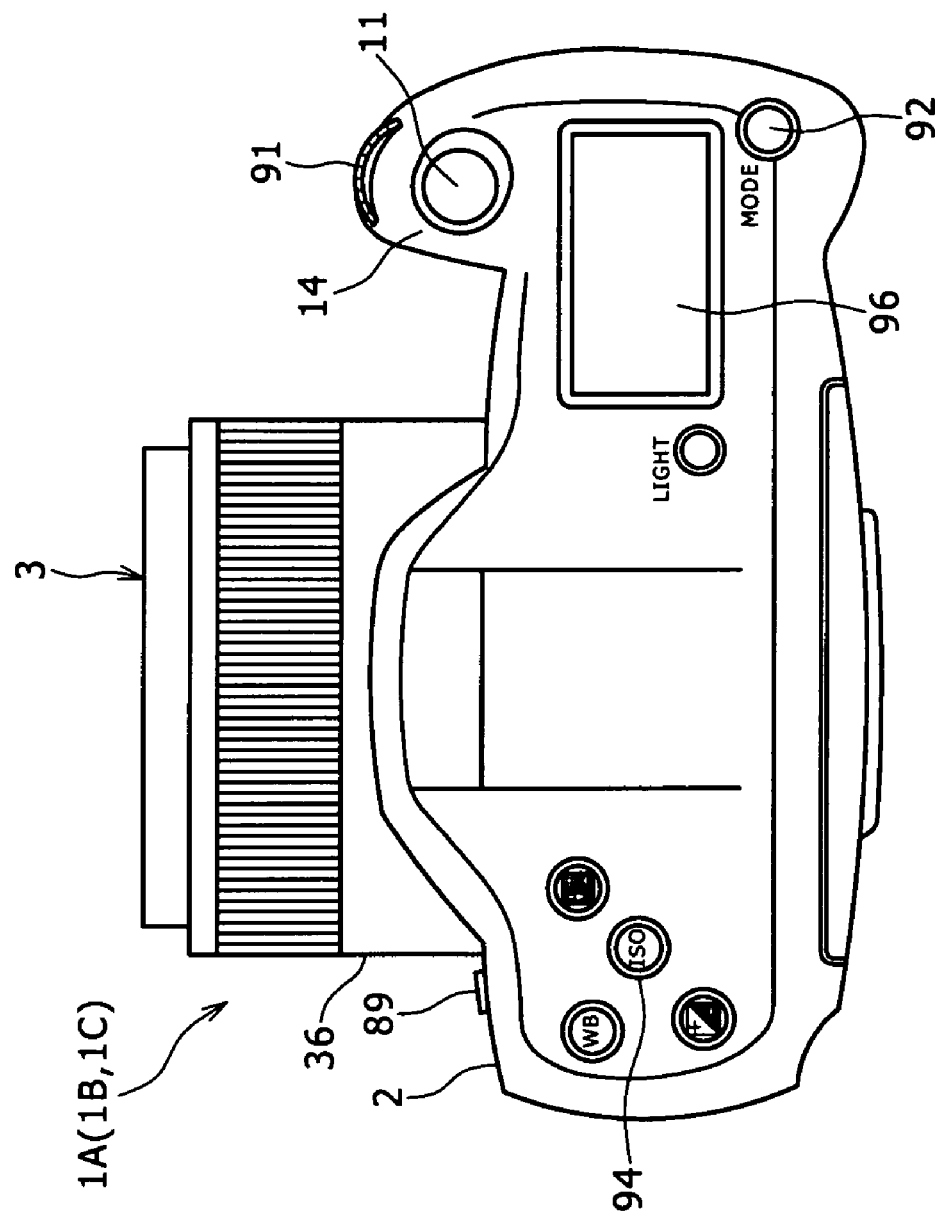
FIG. 2 is an external top view of the imaging apparatus.

FIGS. 1 and 2 are external views of an imaging apparatus 1A practiced as the first embodiment of the present invention. FIG. 1 is an external back view of the imaging apparatus 1A as it is held in horizontal position, and FIG. 2 is an external top view of the imaging apparatus 1A in vertical position. The imaging apparatus 1A is a single-lens reflex digital camera with interchangeable lenses and functions as a portable electronic device.

As shown in FIG. 2 and elsewhere, the imaging apparatus 1A includes a camera body 2. An interchangeable taking lens unit (interchangeable lens) 3 may be attached to and removed from the camera body 2. A vertical position control grip 7 may also be attached and removed to and from the camera body 2.

Figure 4:
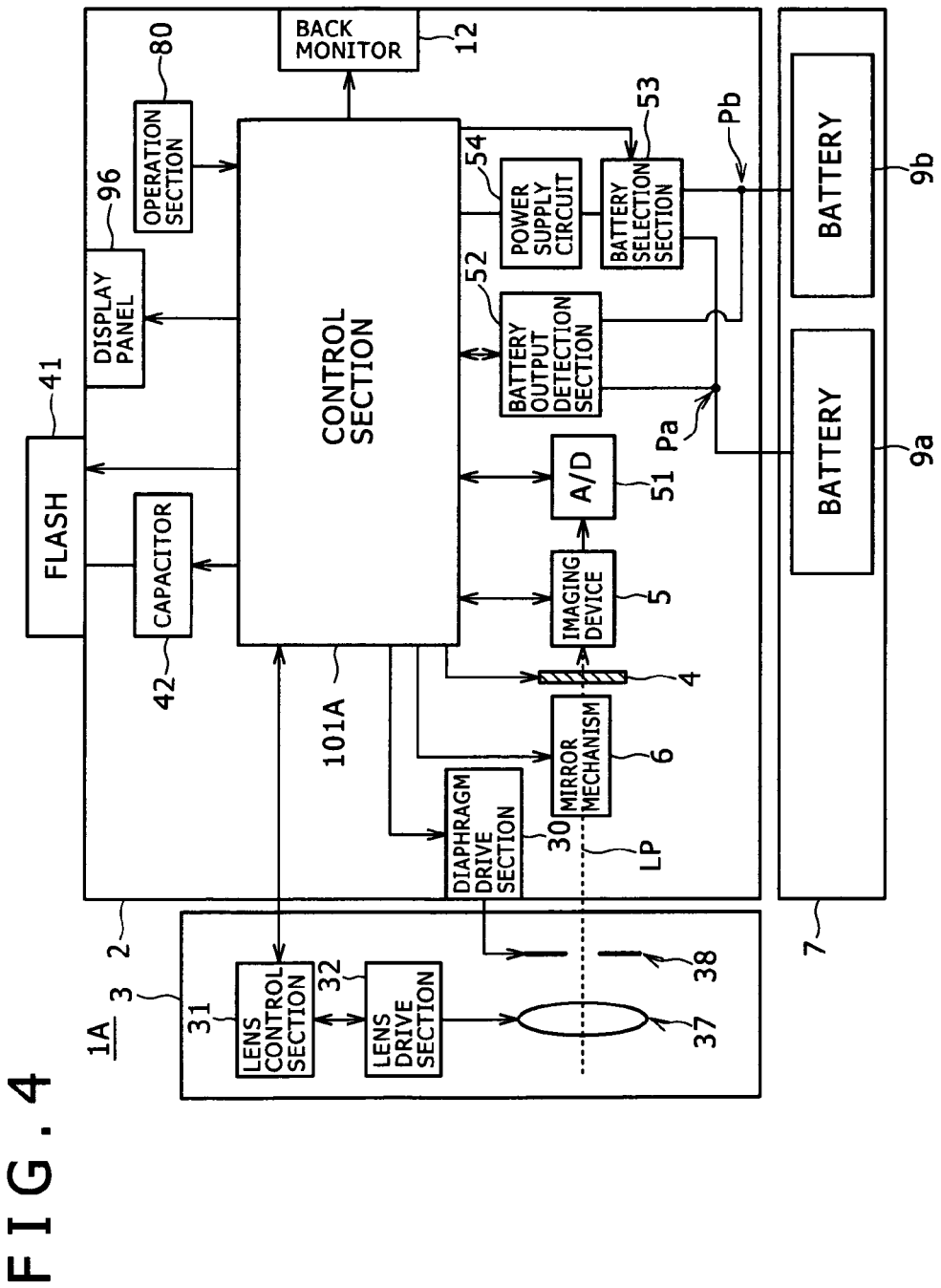
FIG. 4 is a block diagram showing a functional structure of the imaging apparatus.

The taking lens unit 3 is primarily made up of a camera cone 36, a lens group 37 (see FIG. 4) housed inside the camera cone 36, and a diaphragm 38 (see FIG. 4). The lens group 37 includes a focusing lens that may be moved along its optical axis for focal point adjustment.

Approximately in the middle of the camera body 2 is a cylindrical mounting bracket to which the taking lens unit 3 is attached. An attaching-removing button 89 is provided near the cylindrical mounting bracket.

The camera body 2 is furnished with a grip 14 on its left edge as seen from the front (on the right edge as viewed from the back). On the top front of the grip 14 is a shutter button 11 used mainly for designating the start of exposure. Inside the grip 14 are a battery housing and a card housing. The battery housing may illustratively accommodate a rechargeable secondary battery. The card housing may detachably hold a memory card 90 on which to record image data of the images taken.

The shutter button 11 is a two-state detectable button that may be pressed halfway (in S1 state) or completely (in S2 state). Pressing the shutter button 11 halfway causes the S1 state to be entered, which initiates the preparatory operations (e.g., for AF control and AE control operations) for acquiring a still image of the object to be recorded (i.e., an actual image to be taken). Pressing completely the shutter button 11 causes the S2 state to be entered. This button action performs an exposure of the object of interest through image-taking operations (with imaging device 5 in FIG. 4) and carries out a series of steps constituting an imaging process on an image signal obtained by the exposure.

In FIG. 1, an optical finder 10 is furnished approximately on the back top center of the camera body 2. An image of the object of interest is led into the optical finder 10 from the taking lens unit 3. By looking through the optical finder 10, the user can visually recognize the object of interest. More specifically, an image of the object that came through the taking lens unit 3 is reflected upward by a mirror mechanism 6 (see FIG. 4) to reach an eyepiece through a pentaprism. The object image is thus recognized visually by the user. The optical finder 10 may be used to determine the composition of the eventual image to be taken. When an image is about to be actually taken, the mirror mechanism 6 is retracted from the light path so that the light from the taking lens unit 3 is allowed to reach an imaging device 5 (FIG. 4) in synchronism with the opening of a shutter 4 (FIG. 4). This allows the image to be taken of the object of interest (i.e., for acquisition of taken image data).

A back monitor 12 is furnished approximately on the back middle of the camera body 2 (slightly to the left, to be more specific). The back monitor 12 is typically made up of a color liquid crystal display (LCD). The back monitor 12 functions as a display section capable of displaying a menu screen on which to establish imaging conditions and other settings as well as displaying recorded images reproduced upon retrieval from the memory card 90 in reproduction mode.

A main switch 81 is furnished on the back bottom right of the camera body 2 (on the bottom right of the back monitor 12, to be more specific). The main switch 81 is structured as a lever type switch that turns off power when set to the OFF position on the left and turn on power when set to the ON position on the right.

A multi-selector 83 is furnished on the back top right of the camera body 2 (on the right of the back monitor 12, to be more specific). The multi-selector 83 is a joystick type operating member. A stick section 83e accommodating the multi-selector 83 can be tilted up, down, right or left, so that these actions are detected as particular operations. The stock section 83e can also be pushed down, so that this action is detected as another significant operation.

On the back top right of the camera body 2 (on the right of the back monitor 12 and above the multi-selector 83, to be more specific) are a back command dial 82, an AF/MF control button 84, an AE lock button 85, and a reproduction button 86.

The back command dial 82 is a rotating type operating member. How the back command dial 82 is rotated is detected and established as changes in diverse settings.

The AF/MF control button 84 is used to effect switchover between auto focus (AF) and manual focus (MF). In imaging mode, auto focusing (AF) is alternated with manual focusing (MF) every time the AM/MF control button 84 is pressed.

The AE lock button 85 is used to designate AE lock mode in which the status of exposure adjusted by an automatic exposure operation during imaging is locked. Upon flash imaging, the AE lock button 85 functions as a slow-synchronizing button. Upon reproduction, the AE lock button 85 is used as a delete button for designating the images to be deleted out of the images that are being reproduced.

The reproduction button 86 is used to designate the changeover to reproduction mode. In other words, the reproduction button 86 is assigned the function of designating the changeover to reproduction mode (i.e., reproduction mode calling function). Pressing the reproduction button 86 in imaging mode causes the imaging apparatus 1A to enter reproduction mode in which taken images are displayed on the back monitor 12.

A menu button 87 is furnished on the back left of the camera body 2 (on the left of the back monitor 12, to be more specific). The menu button 87 is used to execute the function of displaying the menu screen (i.e., menu screen calling function). Pressing the menu button 87 causes the imaging apparatus 1A to enter information setting mode. In this mode, the back monitor 12 displays the menu screen with a plurality of fields in which various settings are made.

As shown in FIG. 2, on the top of the camera body 2 are a mode setting button 92, an ISO film speed button 94 for adjusting ISO film speed settings, and a liquid display panel (simply called the display panel hereunder) 96 for displaying currently effective settings. A front command dial 91 is furnished in front of the shutter button 11.

The front command dial 91 is a rotating type operating member. How the back command dial 82 is rotated is detected and established as changes in diverse settings.

The mode setting button 92 is an operating member used to set various camera modes (i.e., to perform changeovers between modes). The mode setting is changed cyclically every time the mode setting button 92 is pressed and is established as such. More specifically, pressing the mode setting button 92 cyclically selects one camera mode out of program mode (P mode), aperture priority mode (A mode), shutter speed priority mode (S mode), manual mode (M mode), people imaging mode, landscape imaging mode, and full-automatic imaging mode.

Control values for various imaging modes can be set by operating the back command dial 82 or front command dial 91. For example, in S mode (shutter speed priority mode), a desired shutter speed may be selected from a plurality of preselected shutter speed settings by rotating the front command dial 91. Furthermore, after the ISO film speed button 94 is pressed, a preferred ISO film speed may be set selectively from a plurality of preselected film speed settings by rotating the front command dial 91. The same setting operations can be performed using the back command dial 82 instead of the front command dial 91.

The vertical position control grip 7 functions as an aid for using the imaging apparatus 1A in its vertical position which is not a standard operating position for the apparatus. The vertical position control grip 7 is removably attached to the camera body 2.

Figure 3:
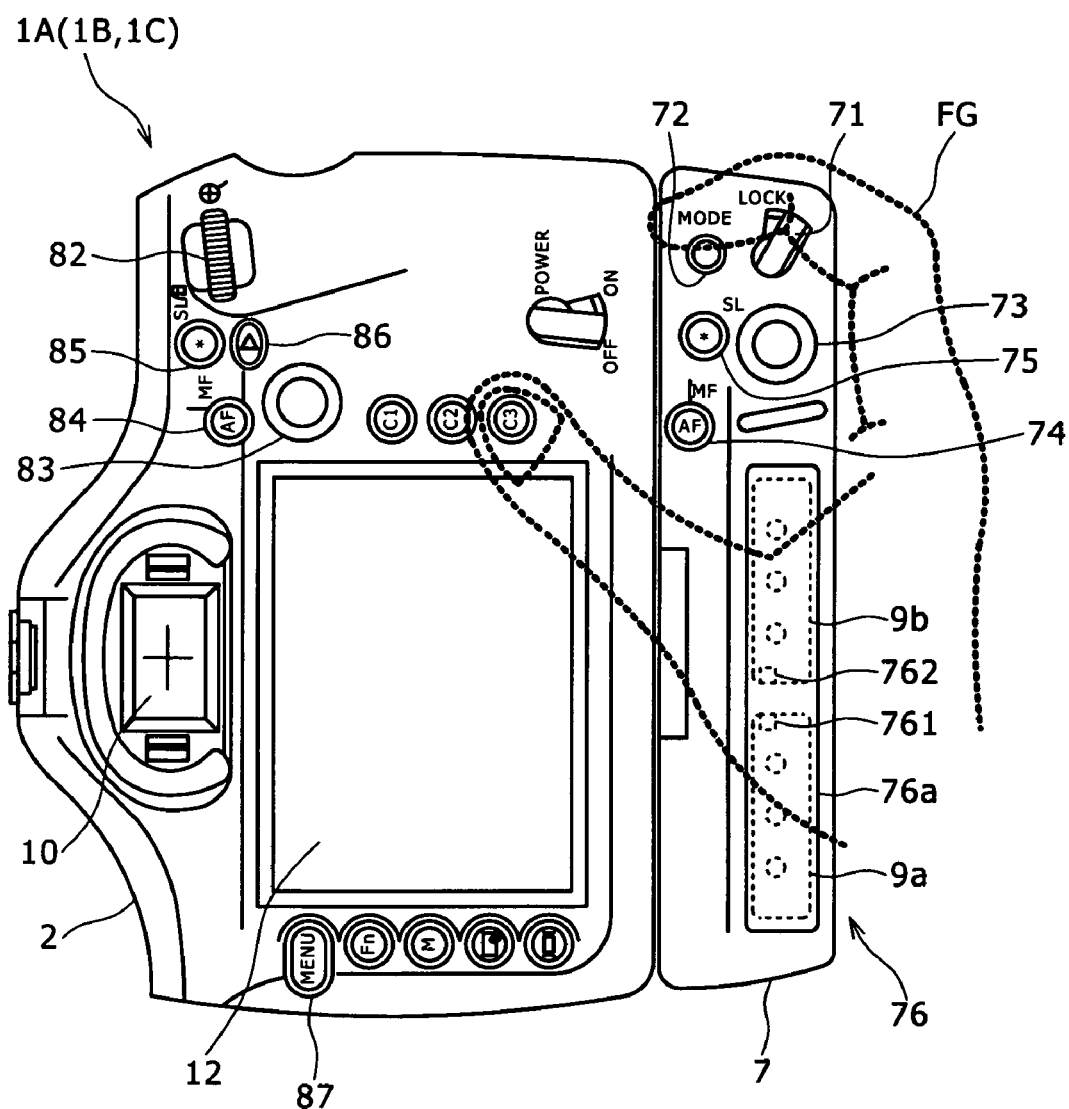
FIG. 3 is another external back view of the imaging apparatus as it is held in vertical position.

FIG. 3 is an external back view of the imaging apparatus 1A as it is held in vertical position. How the vertical position control grip 7 is structured is described below by referring to FIG. 3. The vertical position control grip 7 includes a shutter button 79 (not shown), a mode setting button 72, a multi-selector 73, an AF/MF control button 74, and an AE lock button 75.

The shutter button 79, having the same structure as the shutter button 11, is located slightly below the top of the vertical position control grip 7 in the vertical position shown FIG. 3 (slightly on the left of the right-hand edge in the horizontal position of FIG. 1). In the depth direction, the shutter button 79 is positioned on the front side. In FIG. 3, right-hand fingers (FG) are also shown over the grip in its vertical position. When the imaging apparatus 1A is held vertically, the shutter button 97 allows the user typically to input an imaging start command with an operational feeling substantially similar to that of the shutter button 11.

The mode setting button 72, multi-selector 73, AF/MF control button 74, and AE lock button 75 are structurally similar to the mode setting button 92 (FIG. 2), multi-selector 83 (FIG. 1), AF/MF control button 84, and AE lock button 85, respectively, and provide the functions substantially similar to those of their counterparts. These operating members 72 through 75 are furnished on the back right of the grip in its vertical position and are thus easy to operate.

The vertical position control grip 7 has a battery housing 76 that may accommodate two batteries 9a and 9b provided as secondary batteries. The batteries 9a and 9b can be taken out of the battery housing 96 when a top lid 96a is opened and lock pawls 761 and 762 are slid off their positions.

When the vertical position control grip 7 is attached to the camera body 2, the two components are electrically connected so that pressed status and other data about the operating members 72 through 75 may be transmitted to a control section 101A (see FIG. 4). More specifically, the connection terminal of the vertical position control grip 7 is connected to the battery housing (i.e., to its internal terminal) of the grip 14 not loaded with a battery. The connection links the vertical position control grip 7 electrically with the camera body 2. The connection allows the operating members 72 through 75 to send their signals to the camera body 2 which in turn is powered by the batteries 9a and 9b in the battery housing 76.

The functional blocks of the imaging apparatus 1A will now be described in reference to FIG. 4. FIG. 4 is a block diagram showing the functional structure of the imaging apparatus 1A. As shown in FIG. 4, the imaging apparatus 1A includes an operation section 80, a control section 101A, and a flash 41.

The operation section 80 is made up of various buttons and switches including the shutter button 11 (see FIG. 2). In response to the user's input operations on the operation section 80, the control section 101A carries out corresponding actions.

The control section 101A is formed as a microcomputer constituted primarily by a CPU, a memory and a ROM. The control section 101A reads relevant programs from the ROM and has the CPU carry out the retrieved programs to implement diverse functions.

The control section 101A sends control signals to a lens control section 31 in the taking lens unit 3 to get a lens drive section 32 to control the focus lens position for focusing control. The control section 101A further controls the switchover between two states: a mirror-up state in which the mirror mechanism is retracted from the light path LP, and a mirror-down state in which the mirror mechanism 6 blocks the light path LP.

Based on the photometric measurements taken by a photometric sensor (not shown), the control section 101A sends control signals to a diaphragm drive section 30 to adjust the aperture of a diaphragm 38. The control section 101A further controls the opening and closing of the shutter 4 by means of a drive actuator (not shown).

The imaging device 5 (e.g., a CMOS sensor) creates an image signal representative of a taken image by turning an optical image of the object of interest into an electrical signal through photoelectric conversion. Under control of the control section 101A, the imaging device 5 starts and ends the accumulation of electrical charges for exposure of an object image formed on a light-receiving surface, thereby creating the image signal representative of the object image. The image signal created by the imaging device 5 is input to an A/D (analog/digital) conversion circuit 51.

The image signal created by the imaging device 5 is converted to digital image data (image data) by the A/D conversion circuit 51. The image data from the A/D conversion circuit 51 is subjected to image processing such as γ correction by the control section 101A before being displayed as an image on the back monitor 12.

The flash 41 is provided illustratively as a pop-up type flash that emits light using the power accumulated in a capacitor 42. Whether or not to activate the flash 41 and how long the interval should be between flashes are controlled primarily by the control section 101A.

In the imaging apparatus 1A, the camera body 2 includes a battery output detection section 52, a battery selection section 53, and a power supply circuit 54. The battery output detection section 52 detects output voltage levels (i.e., output status) of the batteries 9a and 9b placed in the vertical position control grip 7 by way of two detection points Pa and Pb of the wiring for electrically connecting the batteries 9a and 9b with the battery selection section 53. Based on the measurements taken by the battery output detection section 52, the control section 101A acquires information including the remaining battery levels of the batteries 9a and 9b. The control section 101A may calculate the remaining levels of the batteries 9a and 9b using illustratively a data table that describes the relations between the output levels of the batteries 9a and 9b and their remaining battery levels.

The battery selection section 53 selectively connects the battery 9a or 9b in the battery housing 76 to the input terminal of the power supply circuit 54, effecting a switchover between the batteries for use as the power source. Between the two batteries 9a and 9b, the control section 101A selects one battery (e.g., the battery with a lower battery level) based on the measurements taken by the battery output detection section 52. The battery 9a or 9b thus selected is connected to the input terminal of the power supply circuit 54. When one of the two batteries 9a and 9b (i.e., part of the housed batteries) is selected as described above for use as the power source of the imaging apparatus 1A on the basis of the measurements taken by the battery output detection section 52, the batteries in the battery housing 76 are used up one at a time. In other words, the two batteries 9a and 9b are kept from being exhausted simultaneously.

The power supply circuit 54 powers the relevant components of the imaging apparatus 1A including the control section 101A by use of one of the batteries 9a and 9b selected by the battery selection section 53.

(Indications of the Battery in Use)

In the imaging apparatus 1A, as described above, one of the two batteries 9a and 9b in the battery housing 76 of the vertical position control grip 7 is used selectively under control of the control section 101A and battery selection section 53. The battery thus selected is readily recognized by the user aided by the indications to be described below in detail.

Figure 5:
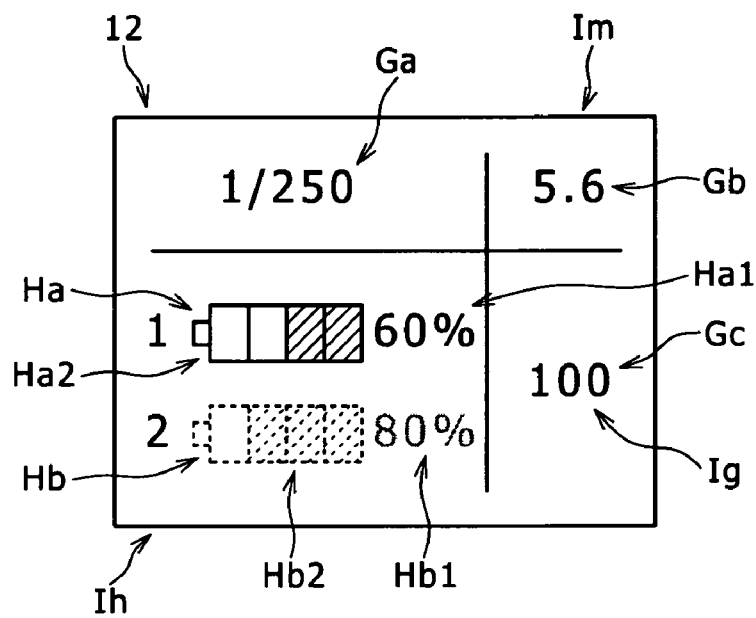
FIG. 5 is a schematic view showing a typical indication displayed on a back monitor of the imaging apparatus.

FIG. 5 is a schematic view showing a typical indication displayed on the back monitor 12. At the time of taking an image, the imaging apparatus 1A causes the back monitor 12 to display imaging-related information Im (FIG. 5) except in reproduction mode and information setting mode. The imaging-related information Im is made up of two kinds of information: imaging condition setting information Ig about the currently established imaging conditions, and battery information Ih about the batteries 9a and 9b placed in the battery housing 76.

The imaging condition setting information Ig is constituted by three kinds of information: setting information Ga about the exposure time (shutter speed) of the imaging device 5, setting information Gb about the aperture (F number) of the diaphragm 38, and information Gc about the ISO film speed (exposure sensitivity) to be set by the ISO film speed button 94.

The battery information Ih is made up of two kinds of information: remaining battery level information Ha indicative of the remaining level of the battery 9a involving numerical (in percentage) information Ha1 and a graphic image Ha2 acquired by the control section 101A based on the electrical-status measurements taken of the batteries 9a and 9b by the battery output detection section 52; and remaining battery level information Hb representative of the remaining level of the battery 9b involving numerical (in percentage) information Hb2 and a graphic image Hb2 derived from the same source. The graphic images Ha2 and Hb2 appear as a bar chart illustrating four remaining battery levels in increments of 25%. The numbers 1 and 2 displayed on the left of the remaining battery level information Ha and Hb point to the corresponding batteries 9a and 9b accommodated in the battery housing 76.

Given the measurements taken by the battery output detection section 52 as described above, it is possible to have the back monitor 12 display the numerical information Ha1 about the remaining level of the battery currently selected by the battery selection section 53 (in percentage points). The monitor display allows the user quantitatively to know how much power is left in the currently employed battery.

The battery information Ih being displayed indicates the remaining battery level of the unselected battery in a less conspicuous manner than that of the battery currently selected by the battery selection section 53. For example, if the battery 9a is selected by the battery selection section 53, the remaining battery level information Ha is displayed in the same manner (i.e., normally) as the imaging condition setting information Ig, while the remaining battery level information Hb is displayed in grayed-out fashion. The back monitor 12 is thus arranged to display suitable indications allowing the user visually to recognize the battery selected by the battery selection section 53 out of the two batteries 9a and 9b accommodated in the battery housing 76. The back monitor display permits easy recognition of the currently used battery by the user.

Figure 6:
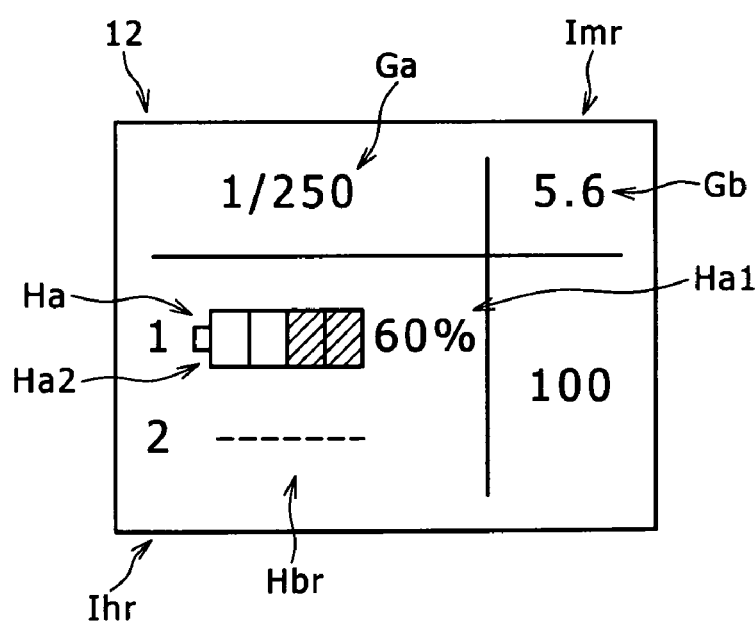
FIG. 6 is a schematic view showing another typical indication displayed on the back monitor.

If only one battery 9a is housed in the battery housing 76 of the vertical position control grip 7, then the back monitor 12 displays imaging-related information Imr such as one shown in FIG. 6. Battery information Ihr included in the imaging-related information Imr replaces the remaining battery level information Hb about the battery 9b in FIG. 5, with an indication Hbr "- - -" which reveals the absence of the battery 9b. This indication allows the user to recognize that the battery 9b is not loaded at present.

(Workings of the Imaging Apparatus 1A)

Figure 7:
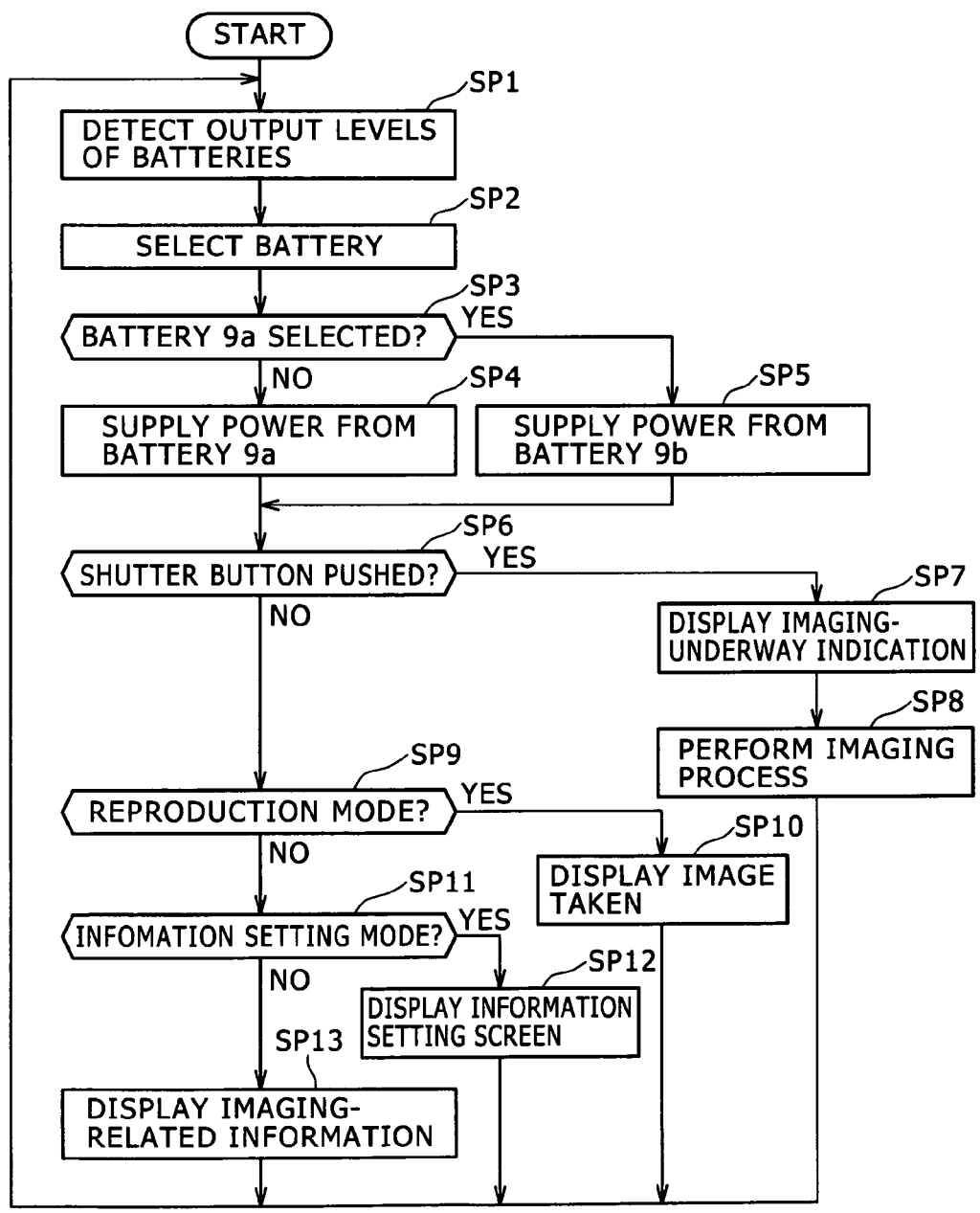
FIG. 7 is a flowchart of steps representing basic operations performed by the imaging apparatus.

FIG. 7 is a flowchart of steps representing basic operations performed in steps by the imaging apparatus 1A. The steps are carried out by the control section 101A when the vertical position control grip 7 with its battery housing 76 accommodating two batteries 9a and 9b is attached to the camera body 2.

In step SP1, the battery output detection section 52 detects the output levels (i.e., voltage values) of the batteries 9a and 9b.

In step SP2, one of the two batteries 9a and 9b is selected on the basis of the battery output levels detected in step SP1. More specifically, the output voltages of the batteries 9a and 9b detected by the battery output detection section 52 are first compared. The control section 101A then selects the battery with the lower output voltage of the two.

In step SP3, a check is made to determine whether the battery 9a was selected in step SP2. If the battery 9a is found to have been selected, then step SP4 is reached. If in step SP3 the battery 9b is found to have been selected, then control is passed on to step SP5.

In step SP4, the battery selection section 53 connects the battery 9a to the power supply circuit 54. This causes the battery 9a to serve as the power source that powers the components of the imaging apparatus 1A.

In step SP5, the battery selection section 53 connects the battery 9b to the power supply circuit 54. This enables the battery 9b to act as the power source that supplies power to the components of the imaging apparatus 1A.

In step SP6, a check is made to determine whether the user has pressed the shutter button 11 (or shutter button 79). In this case, the check involves determining whether the shutter button 11 is pressed completely (to enter the S2 state) by the user. If the shutter button 11 is found to be pressed, then step SP7 is reached. If the shutter button is not found to be pressed completely, then step SP9 is reached.

In step SP7, the back monitor 12 is caused to give a display indicating that an image is being taken. Illustratively, the display of the back monitor 12 is turned off (i.e., blacked out) to inform the user that image-taking is underway.

In step SP8, an imaging process is carried out. More specifically, the object of interest is imaged by the imaging device 5 and an image signal is created thereby. The image signal is then sent to the A/D conversion circuit 51 for conversion into digital image data.

In step SP9, a check is made to determine whether reproduction mode is in effect. The check involves determining whether the user has pressed the reproduction button 86 to enter reproduction mode. If reproduction mode is found to be in effect, then step SP10 is reached. If in step SP9 reproduction mode is not found to be in effect, then control is passed on to step SP11.

In step SP10, the taken image is displayed on the back monitor 12.

In step SP11, a check is made to determine whether information setting mode is in effect. The check involves determining whether the user has pressed the menu button 87 to enter information setting mode. If information setting mode is found to be in effect, then step SP12 is reached. If in step SP11 information setting mode is not found to be in effect, then control is passed on to step SP13.

In step SP12, the back monitor 12 is caused to display an information setting screen (e.g., menu screen) on which various settings are made.

In step SP13, imaging-related information Im such as one shown in FIG. 5 is displayed on the back monitor 12. The back monitor 12 is caused to display an indication identifying one of the two batteries 9a and 9b (housed in the battery housing 76 in FIG. 5) selected in step SP2, together with an indication of the imaging condition setting information Ig about image-taking. The display allows the user to recognize the currently utilized battery and to verify the setting information such as the imaging conditions affecting image-taking.

When the above-outlined steps are carried out by the imaging apparatus 1A, the battery currently selected by the battery selection section 53 is identified using the battery information Ih (FIG. 5) displayed on the back monitor 12, whereas the remaining battery level information Hb about the unselected spare battery is shown grayed out. This makes it possible for the user to easily recognize the battery that was automatically selected by the control section 101A and is currently used.

Second Embodiment

An imaging apparatus 1B practiced as the second embodiment of the present invention is substantially similar in appearance to the imaging apparatus 1A implemented as the first embodiment as shown in FIGS. 1 through 3. Functionally, the second embodiment differs from the first embodiment.

Figure 8:
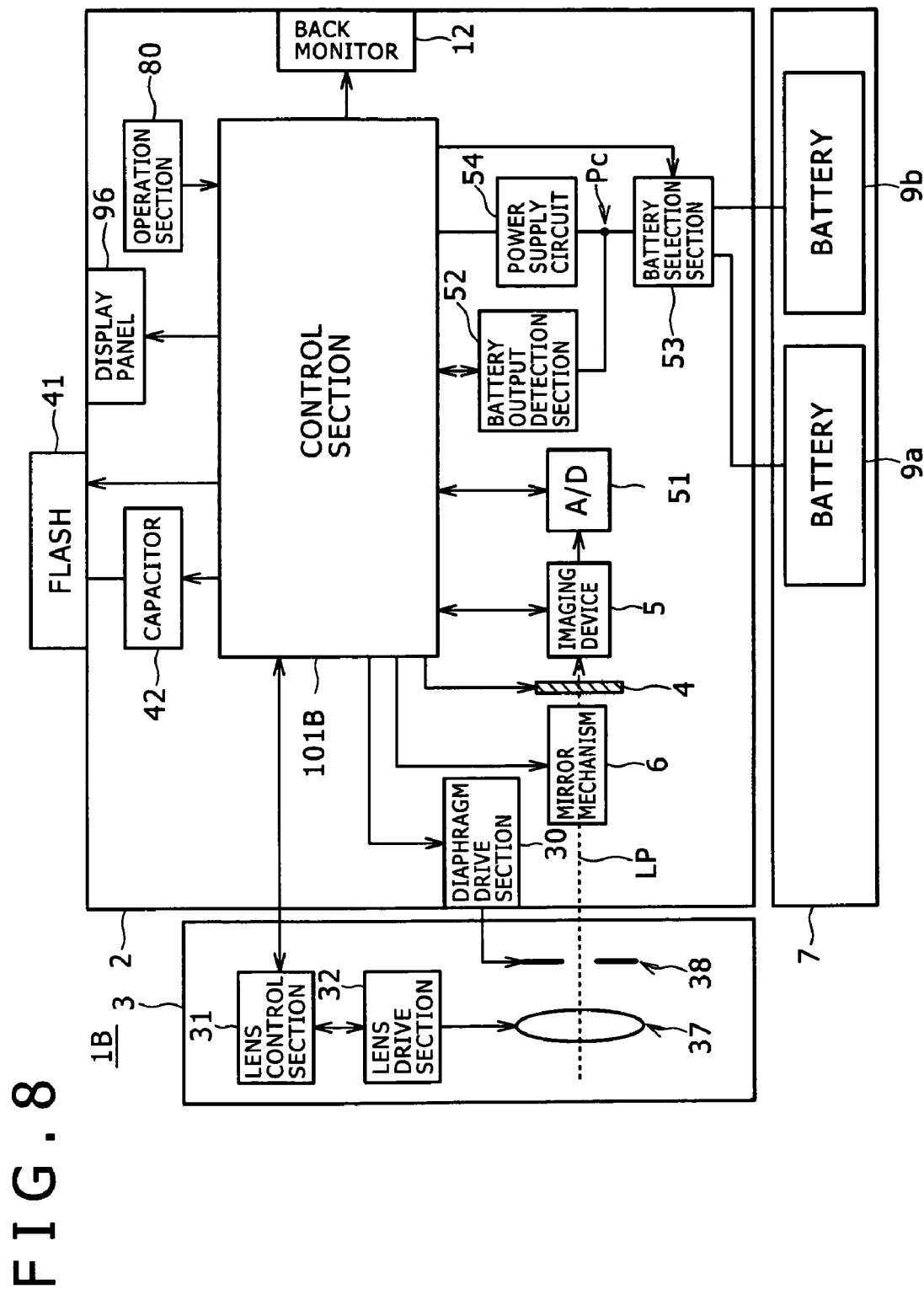
FIG. 8 is a block diagram showing a functional structure of an imaging apparatus practiced as a second embodiment of the present invention.

FIG. 8 is a block diagram showing a typical functional structure of the imaging apparatus 1B. Of the reference numerals found in FIG. 8, those already used in FIG. 4 showing the imaging apparatus 1A designate like or corresponding parts in terms of functionality, and their descriptions will be omitted hereunder where redundant.

Unlike in the first embodiment, the battery output detection section 52 in the imaging apparatus 1B detects output voltage values of the batteries 9a and 9b placed in the vertical position control grip 7 by way of one detection point Pc of the wiring for electrically connecting the battery selection section 53 with the power supply circuit 54. Furnished with the single detection point Pc, the battery output detection section 52 detects the voltage level of one of the batteries 9a and 9b connected electrically to the detection point Pc following battery switchover by the battery selection section 53 connecting the selected battery to the power supply circuit 54 as instructed by a control section 101B.

As with the imaging apparatus 1A of the first embodiment described above, the imaging apparatus 1B enables one of the two batteries 9a and 9b in the vertical position control grip 7 to be selected by the control section 101B and by the battery selection section 53 for use as the power source. The selected battery is readily recognized by the user, as will be discussed below.

(Indications of the Currently Used Battery)

Figure 9:
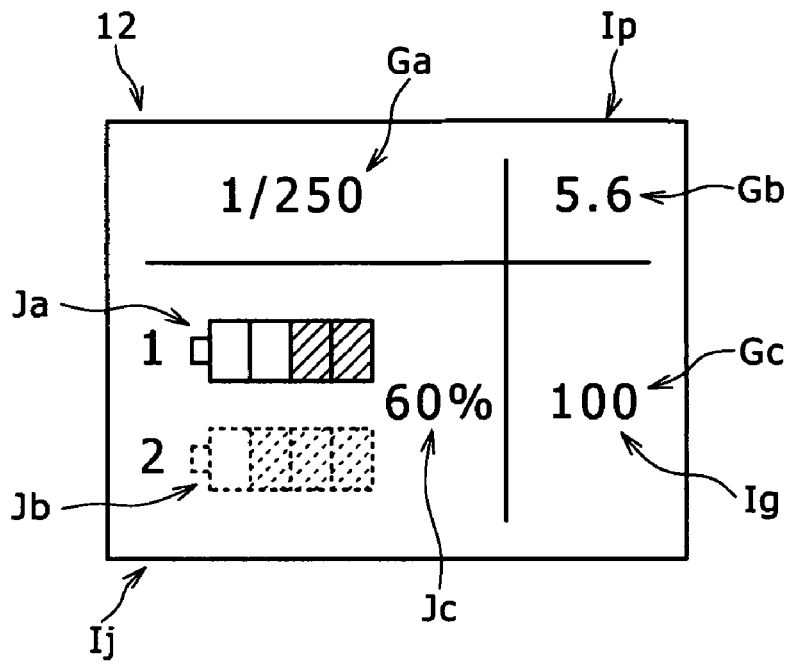
FIG. 9 is a schematic view showing a typical indication displayed on a back monitor of the imaging apparatus in FIG. 8.

FIG. 9 is a schematic view showing a typical indication displayed on the back monitor 12 of the imaging apparatus 1B. The imaging apparatus 1B displays imaging-related information Ip similar to the imaging-related information Im displayed by the imaging apparatus 1A as shown in FIG. 5. The imaging-related information Ip is constituted by imaging condition setting information Ig identical to that of the first embodiment and by battery information Ij similar to the battery information Ih of the first embodiment.

The battery information Ij is made up of three kinds of information: remaining battery level information Ja indicative of the remaining level of the battery 9a using a graphic image; remaining battery level information Jb representative of the remaining level of the battery 9b using another graphic image; and remaining battery level information Jc denoting in percentage points the remaining level of the battery currently selected by the battery selection section 53.

As shown in FIG. 9, the imaging apparatus 1B numerically displays remaining battery level information Jc only about the currently used battery, in contrast to the battery information Ih displayed by the first embodiment as indicated in FIG. 5. The back monitor 12 is caused to display numerically the remaining battery level of the battery selected by the battery selection section 53 (i.e., as remaining battery level information Jc) based on the measurements taken by the battery output detection section 52. The display enables the user to know quantitatively how much power is left in the currently utilized battery.

As with the first embodiment, the battery information Ij about the unselected battery is displayed in a manner less conspicuous (e.g., grayed out) than the remaining battery level information about the battery selected by the battery selection section 53. The display helps the user to recognize the currently used battery.

Figure 10:
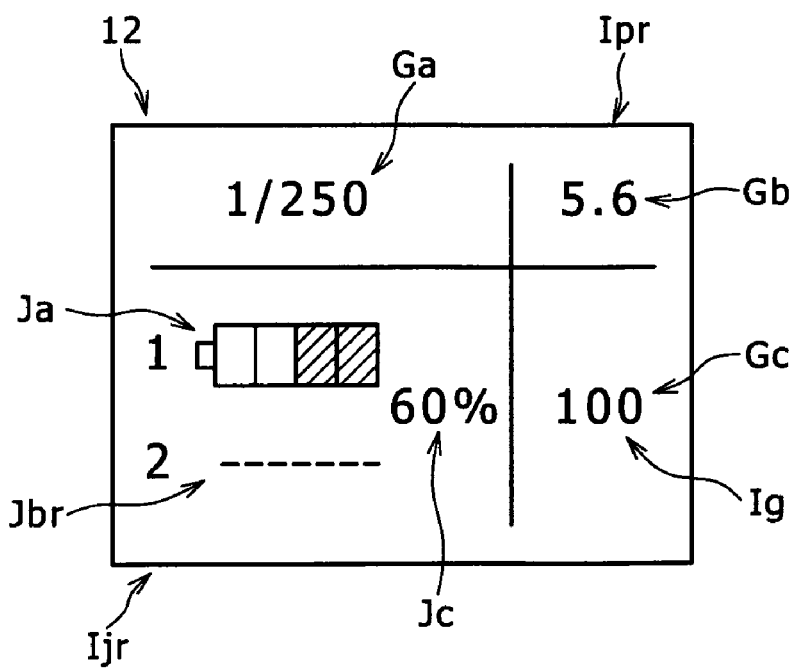
FIG. 10 is a schematic view showing another typical indication displayed on the back monitor of the imaging apparatus in FIG. 8.

If only one battery 9a is placed in the battery housing 76 of the vertical position control grip 7, then imaging-related information Ipr shown in FIG. 10 is illustratively displayed on the back monitor 12. Battery information Ijr included in the imaging-related information Ipr replaces the remaining battery level information Jb about the battery 9b in FIG. 9, with an indication Jbr "- - -" which reveals the absence of the battery 9b. This indication allows the user to recognize that the battery 9b is not loaded at present.

The above-described imaging apparatus 1B carries out the steps substantially similar to those performed by the imaging apparatus 1A of the first embodiment as shown in the flowchart of FIG. 7.

The imaging apparatus 1B discussed above provides substantially the same effects as the imaging apparatus 1A of the first embodiment. What characterizes the imaging apparatus 1B is that the battery selection section 53 selects the battery to be connected to the power supply circuit 54, with the output voltage of the battery 9a or 9b detected by a single detection point Pc (FIG. 8) connected electrically to the input terminal of the power supply circuit 54. This simplified structure still permits appropriate detection of the output status of each accommodated battery.

Third Embodiment

An imaging apparatus 1C practiced as the third embodiment of the present invention is substantially similar in appearance to the imaging apparatus 1B implemented as the second embodiment as shown in FIGS. 1 through 3. Functionally, the third embodiment differs from the second embodiment.

Figure 11:
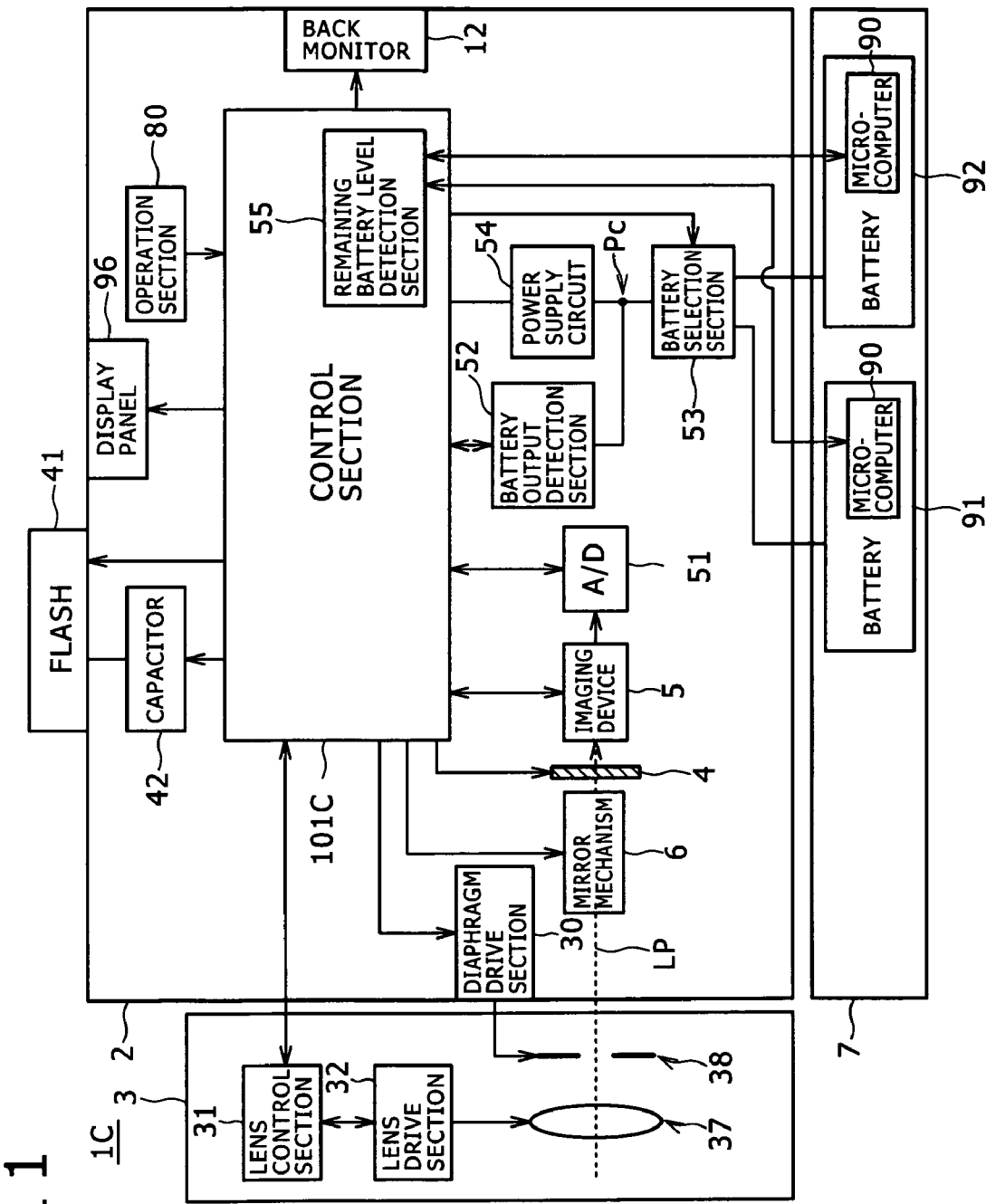
FIG. 11 is a block diagram showing a functional structure of an imaging apparatus practiced as a third embodiment of the present invention.

FIG. 11 is a block diagram showing a typical functional structure of the imaging apparatus 1C. Of the reference numerals found in FIG. 11, those already used in FIG. 8 showing the imaging apparatus 1B designate like or corresponding parts in terms of functionality, and their descriptions will be omitted hereunder where redundant.

In the imaging apparatus 1C, a control section 101C has a remaining battery level detection section 55 as one of its functional blocks. The remaining battery level detection section 55 communicates with microcomputers 90 incorporated in batteries 90 and 92 placed in the battery housing 76. Based on information about the remaining battery levels acquired by the microcomputers 90, the remaining battery level detection section 55 detects the remaining levels of the batteries 91 and 92. The information about the remaining battery levels obtained by the microcomputers 90 includes such data as the amounts of power consumed, voltage values, temperatures, and cell voltage decay rates that are used in calculating the remaining battery levels.

In the imaging apparatus 1C above, as in the imaging apparatus 1A of the first embodiment, one of the two batteries 91 and 92 placed in the vertical position control grip 7 is used selectively under control of the control section 101C and battery selection section 53. When imaging-related information Im such as one shown in FIG. 5 is displayed on the back monitor 12, the user is able to know which battery is currently in use. In the case of the imaging apparatus 1C, the imaging-related information Im (FIG. 5) includes the remaining battery level information Ha and Hb (numerical information Ha1 and Ha2 as well as graphic images Ha2 and Hb2, to be more specific) derived from the remaining battery levels of the batteries 91 and 92 detected by the remaining battery level detection section 55 based on the information sent by the microcomputers 90. The back monitor 12 is then caused to display the numerical information Ha1 and Hb1 (FIG. 5) representative of the remaining levels of the batteries 91 and 92 detected by the remaining battery level detection section 55. The display enables the user to know quantitatively how much power is left in each of the batteries 91 and 92.

The imaging apparatus 1C structured as described above performs the steps substantially similar to those carried out by the first embodiment as shown in the flowchart of FIG. 7.

The imaging apparatus 1C discussed above offers substantially the same effects as the imaging apparatus 1A of the first embodiment. The imaging apparatus 1C is characterized by its simplified structure for accurately detecting the remaining levels of the batteries 91 and 92 in the battery housing 76 on the basis of the information acquired by the microcomputers 90.

(Variations of the Invention)

For the above-described embodiments, it is not mandatory to display in grayed-out fashion the remaining battery level information Hb (FIG. 5) about the unselected battery in order to let the currently used battery be recognized. Alternatively, the currently utilized battery may be identified by the display of battery information Ik and Ikr shown in FIGS. 12 and 13.

Figure 12:
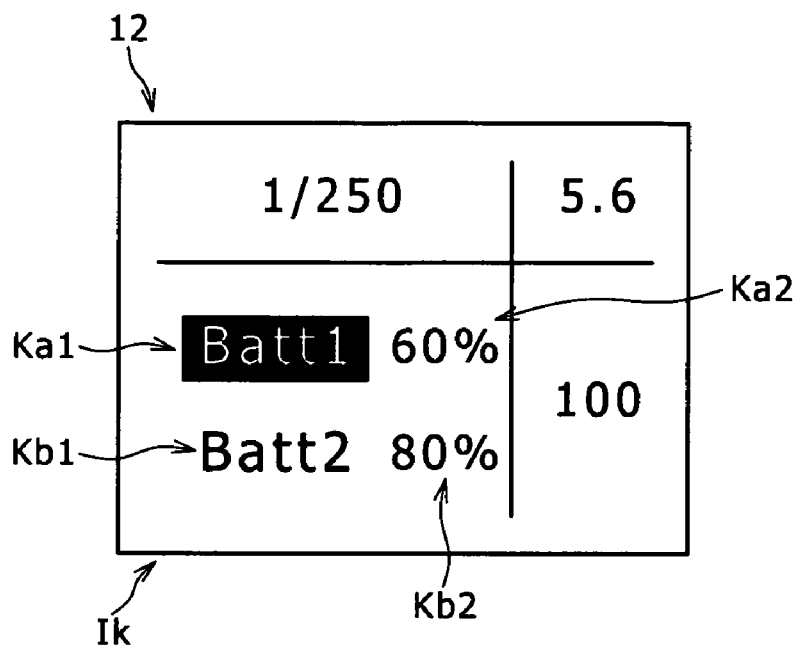
FIG. 12 is a schematic view explanatory of battery information Ik according to a variation of the present invention.

The battery information Ik shown in FIG. 12 is made up of two kinds of information: battery-specific information Ka1 and Kb1 specifying the batteries placed in the battery housing; and remaining battery level information Ka2 and Kb2 indicating the remaining battery levels in percentage points. The battery-specific information Ka1 about the currently employed battery may be displayed in reverse video, with white characters shown on a black background for clear identification of the battery in use.

Figure 13:
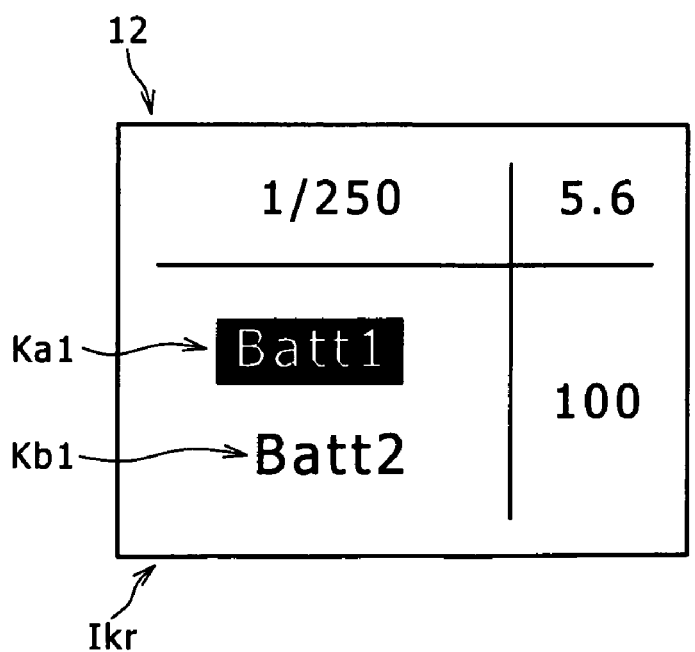
FIG. 13 is a schematic view explanatory of battery information Ikr according to another variation of the present invention.

The battery information Ikr shown in FIG. 13 is composed of the battery information Ik in FIG. 12 minus the remaining battery level information Ka2 and Kb2. With this battery information Ikr, as with the battery information Ik in FIG. 12, the battery-specific information Ka1 about the currently utilized battery may be displayed in reverse video, with white characters shown on a black background for distinct identification of the battery in use.

Of a plurality of batteries accommodated in the battery housing 76, the currently selected battery may be identified in other ways. For example, the information about the currently used battery may be highlighted using a color or a gray scale different from that of the other information. As another alternative, the information may be allowed to blink for emphasis.

The battery housing 76 of each of the above-described embodiments may be arranged to accommodate not two but three or more batteries. Where three or more batteries are placed in the battery housing 76, a suitable display for identifying the battery selected by the battery selection section 53 may be displayed on the back monitor 12. Such a display will also allow the user to identify the currently used battery easily.

For any one of the above-described embodiments, it is not mandatory to select a single battery for use as the power source. Alternatively, a plurality of batteries may be selected out of three or more batteries housed in the battery housing for use as the power source. For example, if four batteries are placed in the battery housing, two batteries may be selected for connection in parallel or in series.

For the battery output detection section 52 of each of the above-described embodiments, it is not mandatory to detect the output voltage of each of the batteries placed in the battery housing 76. Alternatively, the current value of each accommodated battery (i.e., output current status) may be detected.

For each of the embodiments discussed above, it is not mandatory to display the indication identifying the currently selected battery on the back monitor 12 (FIG. 1). Alternatively, the indication may be displayed on the display panel 96 (FIG. 2).

The present invention is not limited in application to the imaging apparatus discussed above. The invention may be applied to many other types of electronic equipment including PDAs (personal digital assistants), mobile personal computers, and cellular phones.

It should be understood by those skilled in the art that various modifications, combinations, sub-combinations and alterations may occur depending on design requirements and other factor in so far as they are within the scope of the appended claims or the equivalents thereof.

What is claimed is:

1. An electronic device having a display section, comprising:
   (a) a housing section configured to house a plurality of batteries;
   (b) a detection section configured to detect status of each of said plurality of batteries housed in said housing section;
   (c) a selection section configured to select part of said plurality of batteries for use as a power supply of said electronic device in accordance with the status detected by said detection section; and
   (d) a display control section configured to display on said display section an indication identifying said part of said plurality of batteries,
   wherein said part of said plurality of batteries is a number of said batteries which is less than a total number of said batteries,
   wherein said detection section includes:
   (b-2) a remaining level detection section configured to detect a remaining battery level of each of said plurality of batteries, and
   wherein said display control section includes:
   (d-1) a section configured to (i) display on said display section numerical information and a graphic image about the remaining battery level of each battery of said part of said plurality of batteries selected by the selection section in accordance with the status detected by said detection section, (ii) display on said display section numerical information and a graphic image about the remaining battery level of each battery of said plurality of batteries unselected by the selection section in accordance with the status detected by said detection section, and (iii) cause the display pertaining to each unselected battery to be displayed in a less conspicuous manner than that of the display of each selected battery so as to enable a user to easily recognize the battery or batteries currently selected for use as the power supply of said electronic device.

2. The electronic device according to claim 1, wherein said detection section includes:
   (b-1) an output detection section configured to detect output status of each of said plurality of batteries.

3. The electronic device according to claim 2, further comprising:
   (e) a selective connection section configured selectively to connect said plurality of batteries to an input terminal of a power supply circuit of said electronic device;
   wherein said output detection section includes a section configured to detect output status of each of said plurality of batteries at a detection terminal connected electrically to the input terminal of said power supply circuit, said plurality of batteries being switched by said selective connection section for connection to said power supply circuit.

4. The electronic device according to claim 1, wherein each of said plurality of batteries has a microcomputer capable of acquiring information about said remaining battery level; and
   wherein said remaining level detection section includes a section configured to detect said remaining battery level of each of said plurality of batteries in accordance with the information acquired by said microcomputer.

5. An imaging apparatus having a display section, comprising:
   (a) a housing section configured to house a plurality of batteries;
   (b) a detection section configured to detect status of each of said plurality of batteries housed in said housing section;
   (c) a selection section configured to select part of said plurality of batteries for use as a power supply of said imaging apparatus in accordance with the status detected by said detection section; and
   (d) a display control section configured to display on said display section an indication identifying said part of said plurality of batteries along with a display of information about imaging,
   wherein said part of said plurality of batteries is a number of said batteries which is less than a total number of said batteries,
   wherein said detection section includes:
   (b-1) a remaining level detection section configured to detect a remaining battery level of each of said plurality of batteries, and
   wherein said display control section includes:
   (d-1) a section configured to (i) display on said display section numerical information and a graphic image about the remaining battery level of each battery of said part of said plurality of batteries selected by the selection section in accordance with the status detected by said detection section, (ii) display on said display section numerical information and a graphic image about the remaining battery level of each battery of said plurality of batteries unselected by the selection section in accordance with the status detected by said detection section, and (iii) cause the display pertaining to each unselected battery to be displayed in a less conspicuous manner than that of the display of each selected battery so as to enable a user to easily recognize the battery or batteries currently selected for use as the power supply of said electronic device.

6. An electronic device having a display section, comprising:
   a detection section configured to detect status of each of a plurality of batteries;
   a selection section configured to select part of said plurality of batteries for use as a power supply of said electronic device in accordance with the status detected by said detection section; and
   a display control section configured to display on said display section an indication identifying said part of said plurality of batteries,
   wherein said part of said plurality of batteries is a number of said batteries which is less than a total number of said batteries,
   wherein said detection section includes:
   (b-1) a remaining level detection section configured to detect a remaining battery level of each of said plurality of batteries, and
   wherein said display control section includes:
   (d-1) a section configured to (i) display on said display section numerical information and a graphic image about the remaining battery level of each battery of said part of said plurality of batteries selected by the selection section in accordance with the status detected by said detection section, (ii) display on said display section numerical information and a graphic image about the remaining battery level of each battery of said plurality of batteries unselected by the selection section in accordance with the status detected by said detection section, and (iii) cause the display pertaining to each unselected battery to be displayed in a less conspicuous manner than that of the display of each selected battery so as to enable a user to easily recognize the battery or batteries currently selected for use as the power supply of said electronic device.

7. An electronic device having display means, comprising:
(a) housing means for housing a plurality of batteries;
(b) detection means for detecting status of each of said plurality of batteries housed in said housing means;
(c) selection means for selecting part of said plurality of batteries for use as a power supply of said electronic device in accordance with the status detected by said detection means; and
(d) display control means displaying on said display means an indication identifying said part of said plurality of batteries,
wherein said part of said plurality of batteries is a number of said batteries which is less than a total number of said batteries,
wherein said detection means includes:
(b-1) means for detecting a remaining battery level of each of said plurality of batteries, and
wherein said display control means includes:
(d-1) means for (i) displaying on said display means numerical information and a graphic image about the remaining battery level of each battery of said part of said plurality of batteries selected by the selection means in accordance with the status detected by said detection means, (ii) displaying on said display means numerical information and a graphic image about the remaining battery level of each battery of said plurality of batteries unselected by the selection means in accordance with the status detected by said detection means, and (iii) causing the display pertaining to each unselected battery to be displayed in a less conspicuous manner than that of the display of each selected battery so as to enable a user to easily recognize the battery or batteries currently selected for use as the power supply of said electronic device.

8. An imaging apparatus having display means, comprising:
(a) housing means for housing a plurality of batteries;
(b) detection means for detecting status of each of said plurality of batteries housed in said housing means;
(c) selection means for selecting part of said plurality of batteries for use as a power supply of said imaging apparatus in accordance with the status detected by said detection means; and
(d) display control means for displaying on said display means an indication identifying said part of said plurality of batteries along with a display of information about imaging,
wherein said part of said plurality of batteries is a number of said batteries which is less than a total number of said batteries,
wherein said detection means includes:
(b-1) means for detecting a remaining battery level of each of said plurality of batteries, and
wherein said display control means includes:
(d-1) means for (i) displaying on said display means numerical information and a graphic image about the remaining battery level of each battery of said part of said plurality of batteries selected by the selection means in accordance with the status detected by said detection means, (ii) displaying on said display means numerical information and a graphic image about the remaining battery level of each battery of said plurality of batteries unselected by the selection means in accordance with the status detected by said detection means, and (iii) causing the display pertaining to each unselected battery to be displayed in a less conspicuous manner than that of the display of each selected battery so as to enable a user to easily recognize the battery or batteries currently selected for use as the power supply of said electronic device.

9. An electronic device having display means, comprising:
detection means for detecting status of each of a plurality of batteries;
selection means for selecting part of said plurality of batteries for use as a power supply of said electronic device in accordance with the status detected by said detection means; and
display control means for displaying on said display means an indication identifying said part of said plurality of batteries,
wherein said part of said plurality of batteries is a number of said batteries which is less than a total number of said batteries,
wherein said detection means includes:
(b-1) means for detecting a remaining battery level of each of said plurality of batteries, and
wherein said display control means includes:
(d-1) means for (i) displaying on said display means numerical information and a graphic image about the remaining battery level of each battery of said part of said plurality of batteries selected by the selection means in accordance with the status detected by said detection means, (ii) displaying on said display means numerical information and a graphic image about the remaining battery level of each battery of said plurality of batteries unselected by the selection means in accordance with the status detected by said detection means, and (iii) causing the display pertaining to each unselected battery to be displayed in a less conspicuous manner than that of the display of each selected battery so as to enable a user to easily recognize the battery or batteries currently selected for use as the power supply of said electronic device.

* * * * *